United States Patent
Chang (10) Patent No.: US 7,405,850 B2
(45) Date of Patent: Jul. 29, 2008

(54) SCANNER APPARATUS (75) Inventor: Deuk-hwan Chang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 989 days.

(21) Appl. No.: 10/734,164

(22) Filed: Dec. 15, 2003

(65) Prior Publication Data

US 2004/0196505 A1 Oct. 7, 2004

(30) Foreign Application Priority Data

Apr. 4, 2003 (KR) .................... 10-2003-0021412

(51) Int. Cl.
*H04N 1/04* (2006.01)
*G03G 15/00* (2006.01)

(52) U.S. Cl. .................. 358/496; 358/498; 358/494; 358/474; 399/377

(58) Field of Classification Search ............... 358/496, 358/498, 494, 505, 474, 492; 399/377, 378; 355/75

See application file for complete search history.

(56) References Cited

U.S. PATENT DOCUMENTS

| | | | | | |
|---|---|---|---|---|---|
| 4,975,735 | A | * | 12/1990 | Bright et al. | 355/75 |
| 5,659,838 | A | * | 8/1997 | Ando et al. | 399/45 |
| 6,043,866 | A | * | 3/2000 | Kawai et al. | 355/75 |
| 6,090,470 | A | * | 7/2000 | Bennett | 428/194 |
| 6,529,295 | B1 | * | 3/2003 | Poulsen et al. | 358/492 |
| 2005/0286091 | A1 | * | 12/2005 | Harel et al. | 358/474 |

* cited by examiner

*Primary Examiner*—Cheukfan Lee
(74) *Attorney, Agent, or Firm*—Staas & Halsey LLP (57) ABSTRACT

A scanner apparatus is provided. The scanner apparatus includes a carrier sheet, which includes a base sheet and a plurality of scan sheets attached to the base sheet and in which each of a plurality of photos is inserted between the base sheet and the scan sheets through a side of each of the scan sheets that is not adhered. A feed roller, which is driven by a power source and moves the carrier sheet at a uniform linear velocity, and a scan unit, which scans images in the photos inserted in the carrier sheet.

12 Claims, 5 Drawing Sheets

SCANNER APPARATUS

CROSS-REFERENCE TO RELATED APPLICATIONS

This application claims the priority of Korean Patent Application No. 2003-21412, filed on Apr. 4, 2003, in the Korean Intellectual Property Office, the disclosure of which is incorporated herein in its entirety by reference.

BACKGROUND OF THE INVENTION

1. Field of the Invention

The present invention relates to a scanner apparatus, and more particularly, to a scanner apparatus having an improved structure in which a plurality of photos are scanned using a carrier sheet, automatically converted into designated image files, and stored in a designated memory device.

2. Description of the Related Art

In general, scanner apparatuses convert images, such as documents, pictures, or photos, into digital data and make the digital data into graphic files that can be stored in a computer, using a software program.

Figure 1:
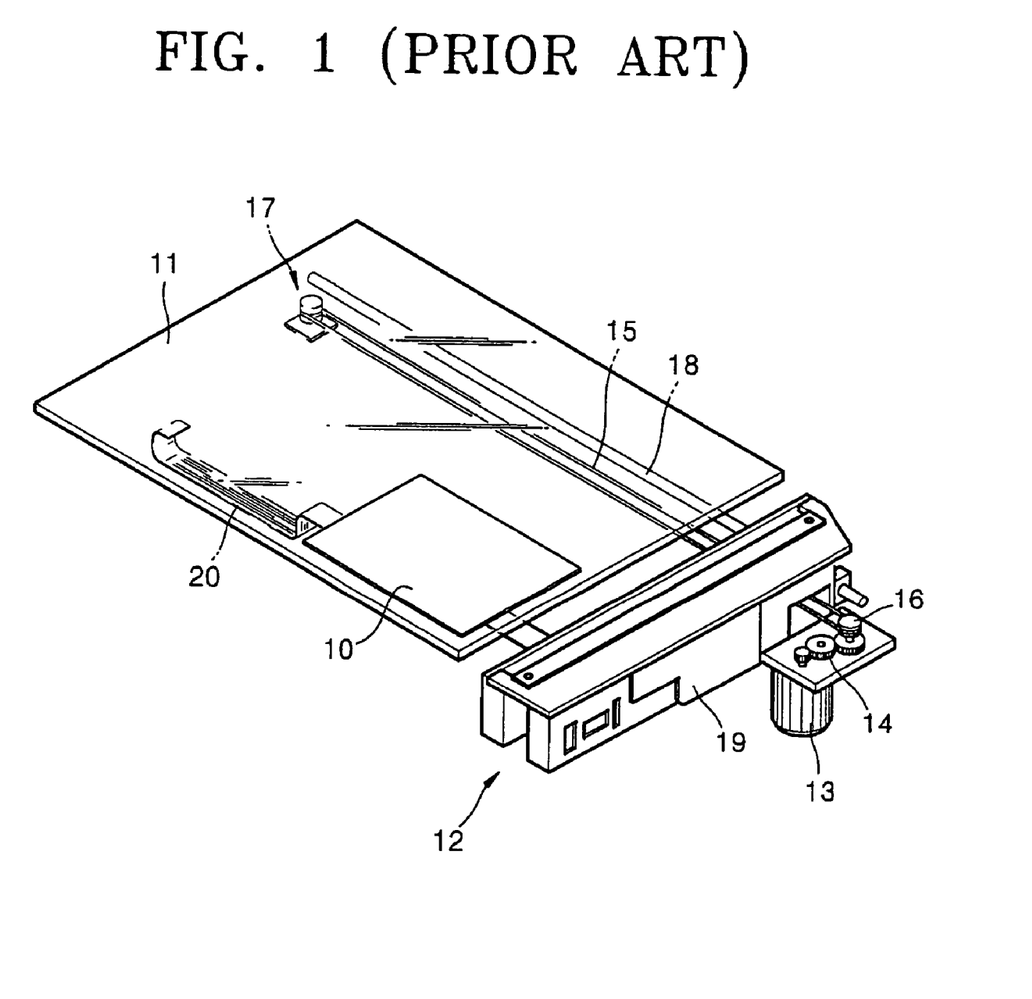
FIG. 1 illustrates a structure of a conventional scanner apparatus.
Figure 2:
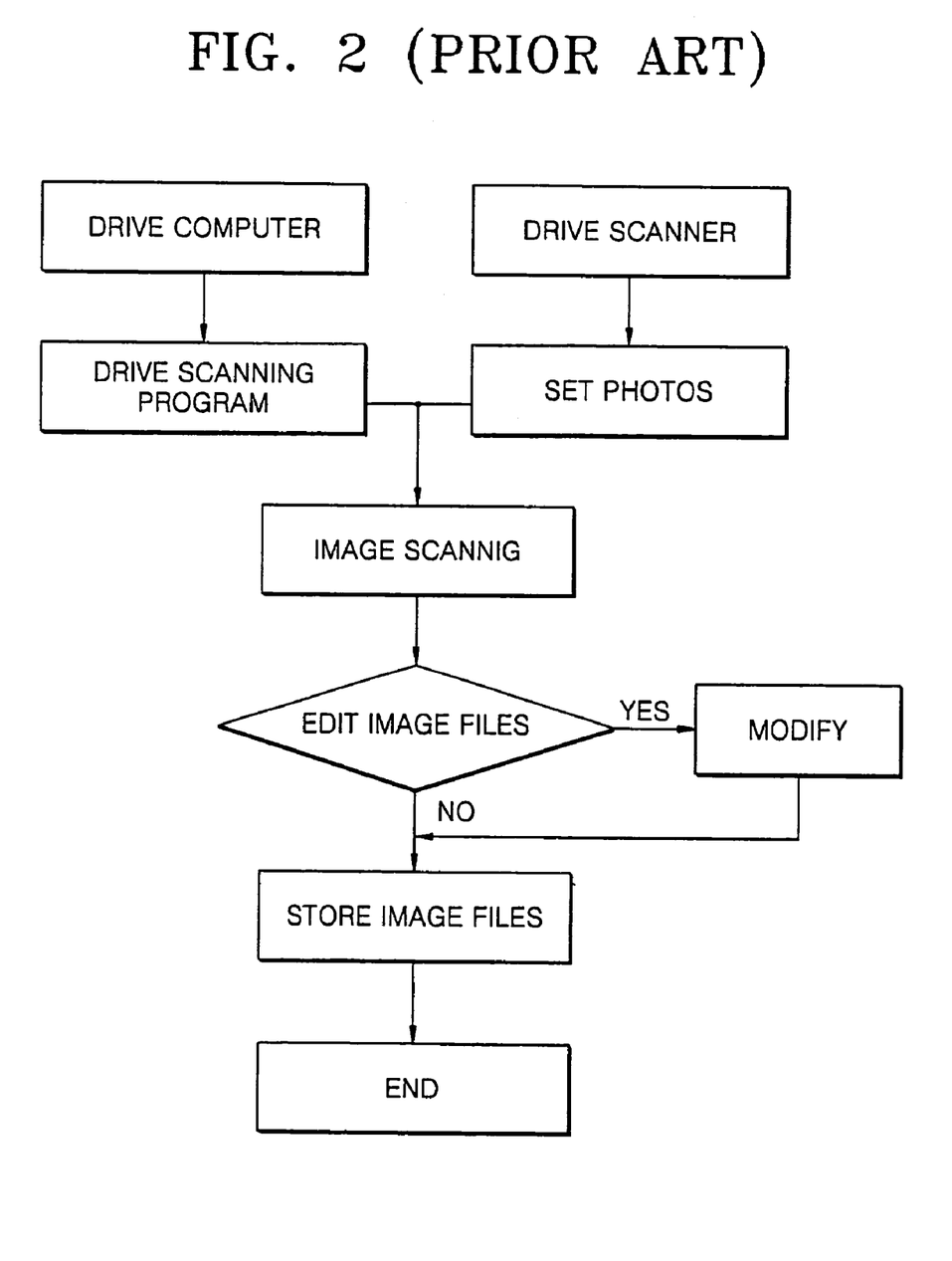
FIG. 2 is a flowchart illustrating a scanning process that is performed by the conventional scanner apparatus shown in FIG. 1.

FIGS. 1 and 2 respectively illustrate a structure of a conventional scanner apparatus and a scanning process that is performed by the conventional scanner apparatus shown in FIG. 1.

Referring to FIG. 1, the conventional scanner apparatus includes a glass plate 11 on which a photo 10 is placed, an optical scan unit 12, such as a charge coupled device (CCD) module or a contact image sensor (CIS), which scans an image in the photo 10, a scan motor 13 which generates a driving force to move the optical scan unit 12, a gear train 14 which increases/decreases the driving force of the scan motor 13, a belt 15 which moves the optical scan unit 12 by the driving force of the scan motor 13, a pulley 16 which transmits power transmitted from the scan motor 13 to the belt 15, a belt tension unit 17 which adjusts the tension of the belt 15, a guide shaft 18 which guides the movement of the optical scan unit 12 so that the optical scan unit 12 does not meander but moves smoothly, a printed circuit board assembly (PBA) 19 which controls scan data and scan mechanism driving, and a cable 20 which outputs the scan data after a scanning operation is completed.

The operation of the conventional scanner apparatus having the above structure will be described with reference to FIGS. 1 and 2. The computer and the scanner apparatus are supplied power and each goes through an initialization process. To scan the image in the photo 10, a scanner cover (not shown) is opened, the photo 10 is placed in a scanning area on the glass plate 11, and then, the scanner cover is closed. Next, a scanning program is executed in the computer such that the scan motor 13 is driven by the PBA 19. A driving force of the scan motor 13 is transmitted to the pulley 16 through the gear train 14, thus driving the belt 15. Subsequently, the optical scan unit 12 connected to the belt 15 moves along the guide shaft 18 by the driving force of the belt 15 and starts a scanning operation. In this case, the belt 15 is always maintained under a predetermined amount of tension by the belt tension unit 17 which provides the belt 15 with a smooth power transfer from the pulley 16. When the optical scan unit 12 completes the scanning operation, scan data is output via the cable 20. Meanwhile, an image that is output in such a manner is displayed on a monitor of the computer, and the overall scanning operation is completed in such a way that the output image is edited or modified using an editing program and stored as a desired image file format.

However, the conventional scanner apparatus having the above structure has the following problems. First, the computer and the scanner apparatus should always be driven simultaneously, so as to scan an image in a photo. Second, since the surface of the photo is different from that of general paper, when the photo is placed onto a surface of the glass plate, dispersion occurs, resulting in image deterioration caused by light interference, such as a wave pattern. Third, when a plurality of photos are scanned, a scanning operation should be repeatedly performed for each of the plurality of photos. Thus, there are inconveniences caused by the repetition of performing the scanning operation, and consumption of a large amount of time. Fourth, after the scanning operation is completed, the scan data should be stored after an image file format is designated.

SUMMARY OF THE INVENTION

The present invention provides a scanner apparatus having an improved structure in which a plurality of photos are scanned using a carrier sheet, automatically converted into designated image files, and stored in a designated memory device, such that the plurality of photos are consecutively scanned, a scanning operation and an image storing operation are simultaneously performed using only a scanner apparatus, and the plurality of scanned photos are stored as the same image file format from a single designation of a storage format for a scan image.

According to an aspect of the present invention, a scanner apparatus includes a carrier sheet, which includes a base sheet and a plurality of scan sheets attached to the base sheet and in which each of a plurality of photos is inserted between the base sheet and the scan sheets through a side of each of the scan sheets that is not adhered, a feed roller, which is driven by a power source and moves the carrier sheet at a uniform linear velocity, and a scan unit, which scans an image in the photos inserted in the carrier sheet.

Additional aspects and/or advantages of the invention will be set forth in part in the description which follows and, in part, will be obvious from the description, or may be learned by practice of the invention.

In an aspect of the present invention a plurality of teeth are formed on both sides of an outer circumference of the feed roller at predetermined intervals, and a plurality of feeding holes in which the teeth are inserted are formed on both sides of the carrier sheet so that the carrier sheet moves when the feed roller is rotated.

In another aspect of the present invention the scan sheets are formed of a transparent material.

The scanner apparatus may further include a sensor, which senses a scanning start position and a scanning end position of each of the photos inserted in the carrier sheet.

In another aspect of the present invention, a plurality of sensing holes are formed in the carrier sheet so that the sensor senses the scanning start position and the scanning end position, and a sensor lever is provided in a position in which the sensing holes pass so that the sensor senses change in upper and lower positions of the sensor lever caused by the movement of the carrier sheet.

The scanner apparatus may further include a calibration unit, which optically calibrates the scan unit, and a tension roller, which applies predetermined tension to the carrier sheet during an image scanning operation.

The scanner apparatus further includes a first power transmission unit, which is provided between the motor and the feed roller and transmits a driving force of the motor to the feed roller.

The scanner apparatus further includes a second power transmission unit, which is provided between the feed roller and the calibration unit and transmits a driving force of the feed roller to the calibration unit. It is also preferable that the scanner apparatus further includes a third power transmission unit, which is provided between the motor and the tension roller and transmits the driving force of the motor to the tension roller.

A linear velocity of an outer circumference of the feed roller is the same as a linear velocity of an outer circumference of the tension roller. It is also possible that image data that is scanned using a function key for setting an image file format is automatically stored as a desired image file format through image processing, and the scanner apparatus further includes a selection key for setting an interface and a front cover, which is opened during a scanning operation and on which the carrier sheet is stacked.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
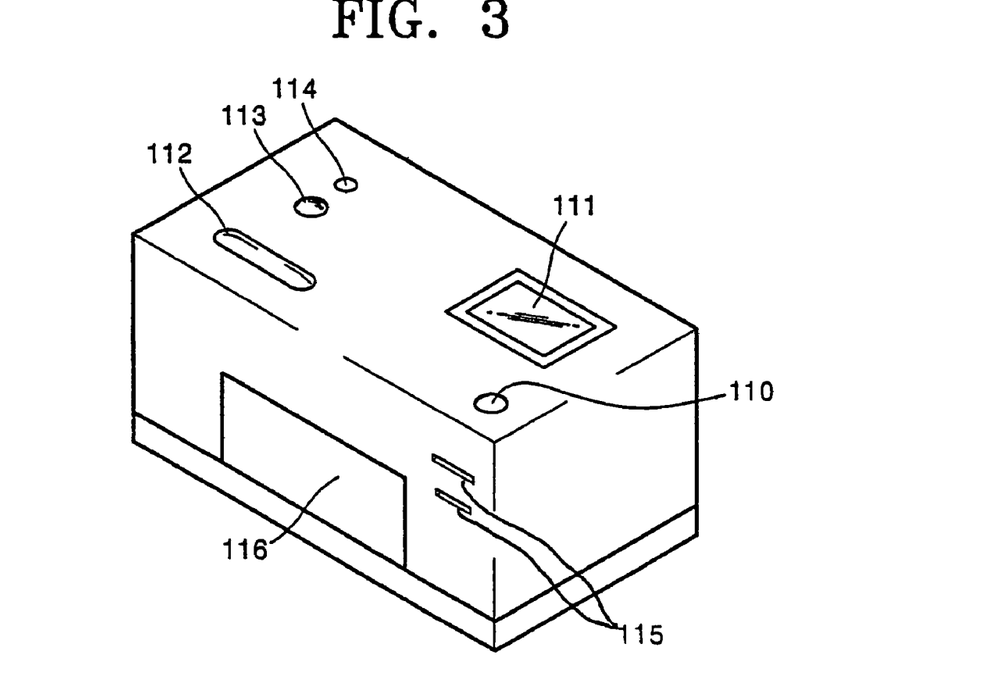
FIG. 3 is an external perspective view of a scanner apparatus according to an embodiment of the present invention.
Figure 4:
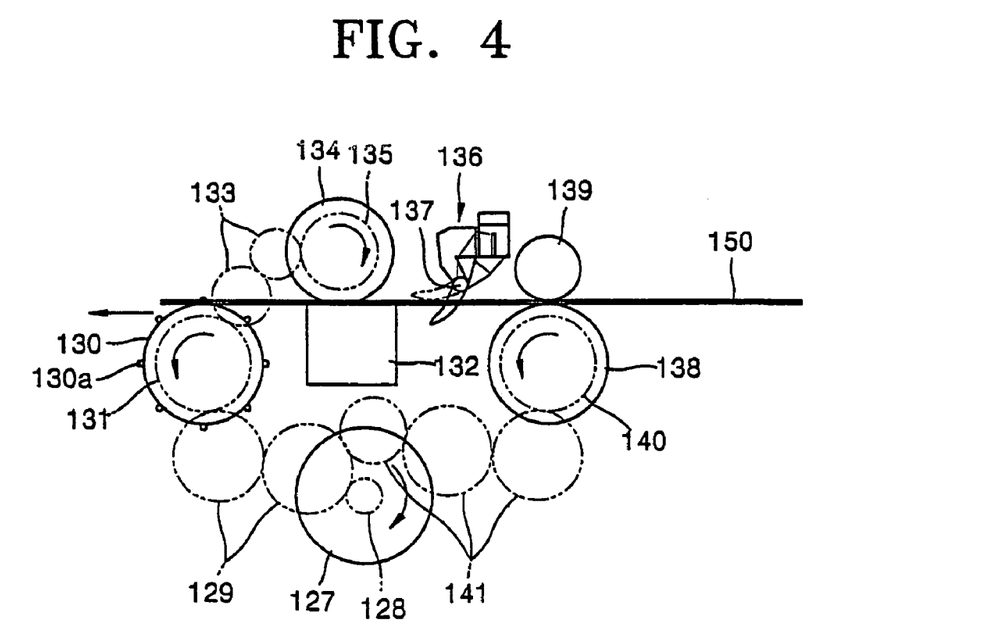
FIG. 4 schematically illustrates a structure of the scanner apparatus shown in FIG. 3.
Figure 5:
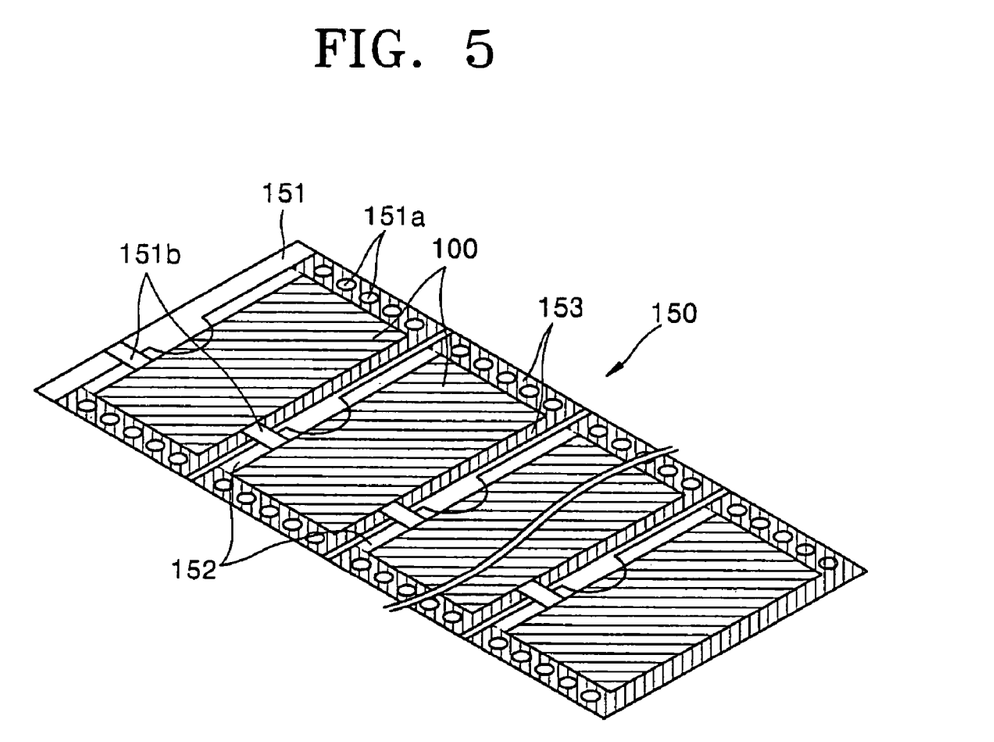
FIG. 5 illustrates a structure of a carrier sheet shown in FIG. 4.

FIG. 3 is an external perspective view of a scanner apparatus according to an embodiment of the present invention, FIG. 4 schematically illustrates a structure of the scanner apparatus shown in FIG. 3, and FIG. 5 illustrates a structure of a carrier sheet shown in FIG. 4.

Referring to FIG. 3, the scanner apparatus in accordance with the present invention includes a power switch 110 that selectively applies power to the scanner apparatus, and a liquid crystal display (LCD) 111 that displays a scanning state and scanning conditions. The scanner apparatus also includes a function key 112 that sets the resolution and image file format, a selection key 114 which selects an interface unit, such as a memory card or a computer, and a scan start key 113. Memory card slots 115 in which a variety of memory cards are mounted, and a front cover 116 that is opened during an image scanning operation of a photo and is used as a tray on which a carrier sheet, that will be described later, is stacked, are also provided outside the scanner apparatus according to the present invention.

Referring to FIGS. 4 and 5, the scanner apparatus according to the present invention includes a carrier sheet 150 in which a plurality of photos 100 are inserted, and a feed roller 130 that feeds the carrier sheet 150 into the scanner apparatus. A scan unit 132 scans images in the plurality of photos 100, and a calibration unit 134 optically calibrates the scan unit 132, while a tension roller 138 and an idle roller 139 apply a predetermined amount of tension to the carrier sheet 150 during an image scanning operation. A sensor 136 is used to sense the scanning start position and the scanning end position of each of the plurality of photos 100 inserted in the carrier sheet 150.

The carrier sheet 150 includes a base sheet 151 and a plurality of scan sheets 152 adhered to the base sheet 151, as shown in FIG. 5. Three sides of each of the scan sheets 152 are adhered to the base sheet 151 to form an adhesion part 153. As such, each of the plurality of photos 100 is inserted between the base sheet 151 and the scan sheets 152 through the one open side of each of the scan sheets 152. Here, preferably, the scan sheets 152 are formed of a transparent material.

A plurality of feeding holes 151a are formed on both sides of the carrier sheet 150, and are used to feed the carrier sheet 150 inside the scanner apparatus. A plurality of sensing holes 151b are formed in the carrier sheet 150 between the scan sheets 152 so that a sensor (136 of FIG. 4) senses the scanning start position and scanning end position of each of the plurality of photos 100.

A first power transmission unit that transmits the driving force of the motor 127 to the feed roller 130, is provided between the motor 127 and the feed roller 130. The first power transmission unit includes a pinion 128 connected to the motor 127, a feed gear 131 connected to the feed roller 130, and a first gear train 129, which connects the pinion 128 to the feed gear 131.

The feed roller 130, powered by the motor 127, moves the carrier sheet 150 at a uniform linear velocity. Here, a plurality of teeth 130a are formed on both sides of an outer circumference of the feed roller 130 at predetermined intervals. The teeth 130a are inserted in the feeding holes 151a formed in the carrier sheet 150. Thus, the interval between the teeth 130a formed on the feed roller 130 is the same as the interval between the feeding holes 151a formed in the carrier sheet 150.

The scan unit 132 scans a plurality of photo images inserted in the carrier sheet 150, and a contact image sensor (CIS) or a charge coupled device (CCD) module may be used as the scan unit 132.

The calibration unit 134 optically calibrates the scan unit 132 and simultaneously is closely attached to the scan unit 132 to generate a feeding force. The calibration unit 134 may be a white roller or a white bar.

A second power transmission unit that transmits the driving force of the feed roller 130 to the calibration unit 134, is provided between the feed roller 130 and the calibration unit 134. The second power transmission unit includes a feed gear 131 connected to the feed roller 130, a scan gear 135 connected to the calibration unit 134, and a second gear train 133 which connects the feed gear 131 to the scan gear 135.

The tension roller 138 and the idle roller 139 are disposed on opposite sides of the carrier sheet 150. The tension roller 138 and the idle roller 139 apply pressure to the carrier sheet 150 so that the predetermined amount of tension acts on the carrier sheet 150.

A third power transmission unit, which transmits the driving force of the motor 127 to the tension roller 138, is provided between the motor 127 and the tension roller 138. The third power transmission unit includes the pinion 128 connected to the motor 127, a tension gear 140 connected to the tension roller 138, and a third gear train 141 that connects the pinion 128 to the tension gear 148.

The sensor 136 includes a sensor lever 137 that senses the scanning start position and scanning end position of each of the photos 100. The sensor lever 137 is provided in a position that communicates with the sensing holes 151b as the holes 151b pass. Thus, when the carrier sheet 150 moves, the sensor lever 137 senses a change in the position of the sensor lever 137 and determines the scanning start position and scanning end position of each of the photos 100.

Figure 6:
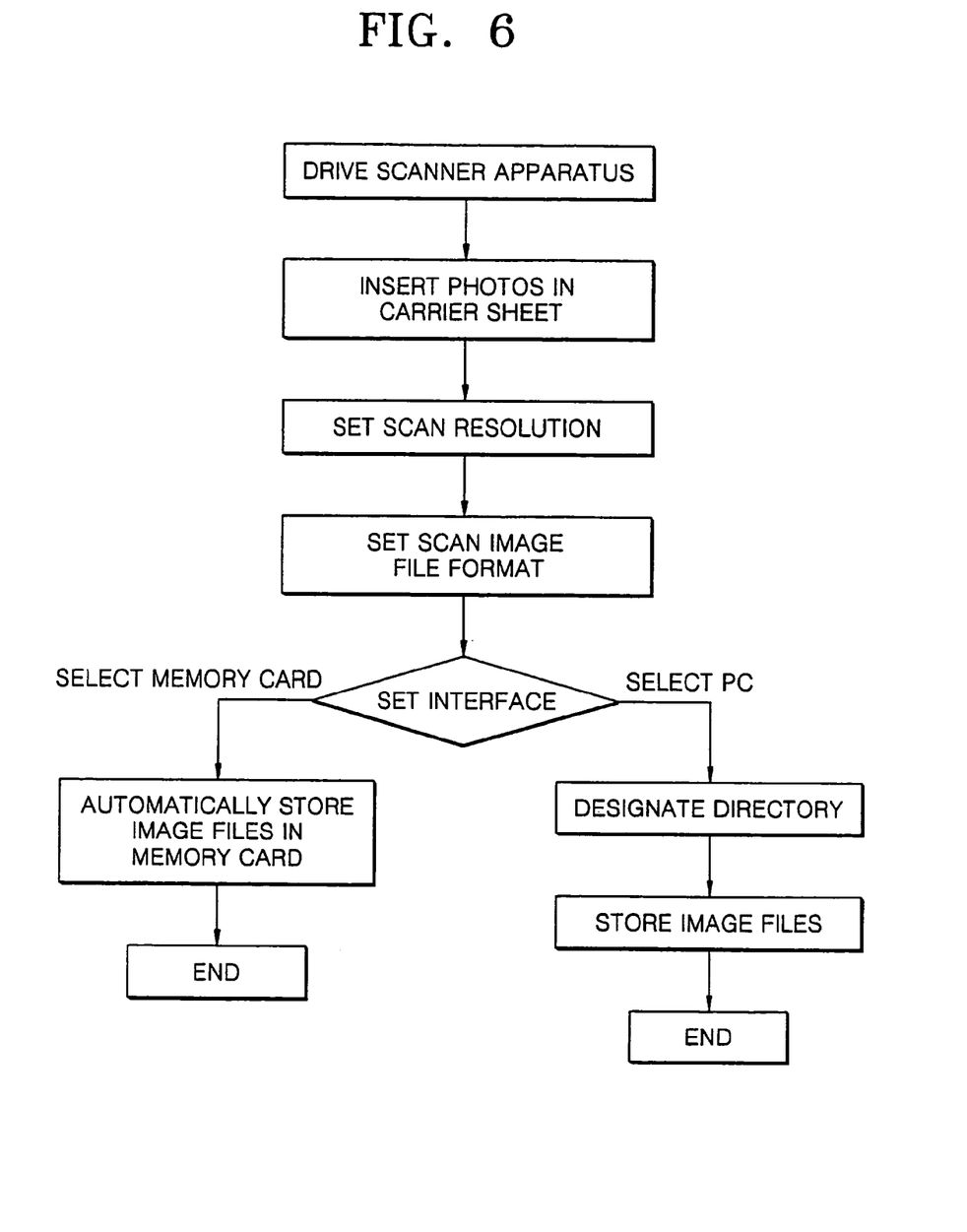
FIG. 6 is a flowchart illustrating a scanning process that is performed by the scanner apparatus according to an embodiment of the present invention.

FIG. 6 is a flowchart illustrating a scanning process that is performed by the scanner apparatus according to an embodiment of the present invention.

Hereinafter, the operation of the scanner apparatus according to the embodiment of the present invention will be described with reference to FIGS. 3 through 6.

First, the photos 100 are inserted into the carrier sheet 150 so that the images of the photos 100 are positioned toward the scan sheet 152, and the power switch 110 of the scanner apparatus is turned on.

Subsequently, the front cover 116 is opened, and the carrier sheet 150 is mounted in the scanner apparatus. In this case, the teeth 130a of the feed roller 130 are engaged with the feeding holes 151a of the carrier sheet 150 so that there are no differences between the right and left sides.

After the carrier sheet 150 in which the photos 100 are inserted is set in the scanner apparatus, an interface is set using the selection key 114. In other words, when memory cards are used, a desired memory card is inserted in the appropriate memory card slot 115, and when PCs are used, a directory is designated, and then, a memory card or PC is selected as the storage device using the selection key 114.

Next, when the setting of a storage location for scanned images is completed, the scan resolution and a scan image file format are selected using the function key 112, thereby completing scanning preparation.

When the scan start key 113 is pressed in the scanner apparatus, current is applied to the motor 127 so that the pinion 128 rotates. The driving force of the pinion 128 is transmitted to the feed gear 131 via the first gear train 129, and the feed roller 130 rotates. As the feed roller 130 is rotated, the carrier sheet 150 moves due to the feeding holes 151a being placed on the teeth 130a of the feed roller 130.

When the feed roller 130 is driven, the driving force of the feed roller 130 is transmitted to the scan gear 135 via the second gear train 133, and the calibration unit 134 is rotated. In this case, while the carrier sheet 150 moves, the scan unit 132, such as the CIS or CCD module, installed under the carrier sheet 150 starts a scanning operation.

The scanning start time and scanning end time are determined by determination of high/low signals of the sensor 136 that are generated by the operation of the sensor lever 137 passing over the sensing holes 151b of the carrier sheet 150.

When the carrier sheet 150 moves, the driving force of the motor 127 is transmitted to the tension gear 140 via the third gear train 141, and the tension roller 138 is rotated. The idle roller 139 is rotated by pressure applied from the tension roller 138 and the driving force is caused by frictional resistance. Applying a predetermined tension to the carrier sheet 150 by the tension roller 138 and the idle roller 139, prevents wrinkling or curling of the carrier sheet 150.

When a scanning operation of a final image of the carrier sheet 150 is completed, the scanned images are automatically stored in memory as a designated image file format, and the overall scanning operation is completed.

It is beneficial that the linear velocity of the outer circumference of the feed roller 130 is the same as a linear velocity of an outer circumference of the tension roller 138. When the linear velocity of the outer circumference of the feed roller 130 is different from that of the outer circumference of the tension roller 138, the carrier sheet 150 may misfeed and the resultant scanned images may be poor in quality.

As described above, the scanner apparatus according to the present invention has the following aspects. First, since a plurality of photos are consecutively scanned and stored in the designated memory, a large amount of photos can be scanned within a short time. Second, since a scanning operation and an image storing operation are simultaneously performed using only the scanner apparatus, an additional apparatus for storing images is unnecessary. Third, since a storage format for a scan image is only stored once, the plurality of scanned photos are stored as the same image file format. Fourth, since the formation of a wave pattern caused by light interference that may occur during a scanning operation of photo images, is prevented, the scanning quality is improved. Fifth, photos that have been kept in an album are simply scanned and stored in CDs that can be easily kept. Sixth, since a memory card or a computer is used for image storage, the data can be transported freely, and images can be edited while the entire image is viewed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A scanner apparatus comprising:
a carrier sheet, which includes a base sheet and a plurality of scan sheets attached to the base sheet and in which each of a plurality of photos is inserted between the base sheet and the respective scan sheets through a side of each of the scan sheets that is not adhered;
a feed roller, which is driven by a power source and moves the carrier sheet at a uniform linear velocity;
a scan unit, which scans an image in the photos inserted in the carrier sheet;
a sensor, which senses a scanning start position and a scanning end position of each of the photos inserted in the carrier sheet,
wherein a plurality of sensing holes are formed in the carrier sheet so that the sensor senses the scanning start position and the scanning end position.

2. The apparatus of claim 1, further comprising a plurality of teeth formed on both sides of an outer circumference of the feed roller at predetermined intervals.

3. The apparatus of claim 2, wherein a plurality of feeding holes in which the teeth are inserted are formed on both sides of the carrier sheet so that the carrier sheet moves when the feed roller is rotated.

4. The apparatus of claim 1, wherein the scan sheets are formed of a transparent material.

5. The apparatus of claim 1, further comprising a sensor lever in a position in which the sensing holes pass so that the sensor senses change in upper and lower positions of the sensor lever caused by the movement of the carrier sheet.

6. The apparatus of claim 1, wherein image data that is scanned using a function key for setting an image file format is automatically stored as a desired image file format through image processing.

7. The apparatus of claim 1, further comprising a selection key setting an interface to control the storage of the scanned image data.

8. The apparatus of claim 1, further comprising a front cover, which is opened during a scanning operation and on which the carrier sheet is stacked.

9. A scanner apparatus comprising:
- a carrier sheet, which includes a base sheet and a plurality of scan sheets attached to the base sheet and in which each of a plurality of photos is inserted between the base sheet and the respective scan sheets through a side of each of the scan sheets that is not adhered;
- a feed roller, which is driven by a power source and moves the carrier sheet at a uniform linear velocity;
- a scan unit, which scans an image in the photos inserted in the carrier sheet;
- a calibration unit, which optically calibrates the scan unit; and
- a power transmission unit, which is provided between the feed roller and the calibration unit and transmits a driving force of the feed roller to the calibration unit.

10. A scanner apparatus comprising:
- a carrier sheet, which includes a base sheet and a plurality of scan sheets attached to the base sheet and in which each of a plurality of photos is inserted between the base sheet and the respective scan sheets through a side of each of the scan sheets that is not adhered;
- a feed roller, which is driven by a power source and moves the carrier sheet at a uniform
- a scan unit, which scans an image in the photos inserted in the carrier sheet;
- a tension roller, which applies predetermined tension to the carrier sheet during an image scanning operation; and
- a power transmission unit, which is provided between the power source and the tension roller and transmits the driving force of the power source to the tension roller.

11. The apparatus of claim 10, wherein a linear velocity of an outer circumference of the feed roller is the same as a linear velocity of an outer circumference of the tension roller.

12. A scanner apparatus comprising:
- a carrier sheet, which includes a base sheet and a plurality of scan sheets attached to the base sheet and in which each of a plurality of photos is inserted between the base sheet and the respective scan sheets through a side of each of the scan sheets that is not adhered;
- a feed roller, which is driven by a power source and moves the carrier sheet at a uniform linear velocity; and
- a scan unit, which scans an image in the photos inserted in the carrier sheet; and
- a power transmission unit, which is provided between the power source and the feed roller and transmits a driving force of the power source to the feed roller.

* * * * *

UNITED STATES PATENT AND TRADEMARK OFFICE
CERTIFICATE OF CORRECTION

PATENT NO. : 7,405,850 B2  Page 1 of 1
APPLICATION NO. : 10/734164
DATED : July 29, 2008
INVENTOR(S) : Deuk-Hwan Chang It is certified that error appears in the above-identified patent and that said Letters Patent is hereby corrected as shown below:

Column 6, Line 43, after "sheet" insert --and--.

Column 8, Line 2, after "uniform" insert --linear velocity--.

Signed and Sealed this

Eleventh Day of November, 2008

JON W. DUDAS
*Director of the United States Patent and Trademark Office*